(12) United States Patent
Han et al.

(10) Patent No.: US 11,349,969 B2
(45) Date of Patent: May 31, 2022

(54) COMMUNICATION METHOD, NETWORK DEVICE, AND TERMINAL

(71) Applicant: HUAWEI TECHNOLOGIES CO., LTD., Guangdong (CN)

(72) Inventors: Feng Han, Shanghai (CN); Yinghao Jin, Shanghai (CN); Hong Li, Shanghai (CN); Wei Tan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 49 days.

(21) Appl. No.: 16/828,179

(22) Filed: Mar. 24, 2020

(65) Prior Publication Data
US 2020/0228637 A1 Jul. 16, 2020

Related U.S. Application Data

(63) Continuation of application No. PCT/CN2018/106629, filed on Sep. 20, 2018.

(30) Foreign Application Priority Data

Sep. 26, 2017 (CN) .......................... 201710885236.1

(51) Int. Cl.
*H04L 69/322* (2022.01)
*H04W 76/10* (2018.01)
(Continued)

(52) U.S. Cl.
CPC ............ *H04L 69/322* (2013.01); *H04L 67/14* (2013.01); *H04W 28/0257* (2013.01);
(Continued)

(58) Field of Classification Search
None
See application file for complete search history.

(56) References Cited

U.S. PATENT DOCUMENTS

2009/0052384 A1* 2/2009 Zisimopoulous ..... H04L 47/263 370/329
2009/0238207 A1* 9/2009 Zhao ..................... H04W 28/22 370/468
(Continued)

FOREIGN PATENT DOCUMENTS

CN 103444148 A 12/2013
CN 103596272 A 2/2014
(Continued)

OTHER PUBLICATIONS

ZTE,"Discussion on Session-AMBR and UE-AMBR for DC",3GPP TSG-RAN WG3#97 R3-172690,Berlin, Germany, Aug. 21-25, 2017,total 4 pages.

*Primary Examiner* — Diane L Lo
(74) *Attorney, Agent, or Firm* — Womble Bond Dickinson (US) LLP

(57) ABSTRACT

This application provides a communication method, a network device, and a terminal. The communication method includes: obtaining, by a first network device, a first AMBR of a PDU session, where the first AMBR is an AMBR of a flow that is served by a second network device in the PDU session, the first network device is a master node serving a terminal, and the second network device is a secondary node serving the terminal; sending, by the first network device, first information to the second network device, where the first information includes the first AMBR, so that the second network device provides, based on the first AMBR, the PDU session service for the terminal. The communication method, the network device, and the terminal provided in this application help ensure a session-level aggregate maximum rate requirement in a dual connectivity scenario.

8 Claims, 8 Drawing Sheets

(51) Int. Cl.
*H04L 67/14* (2022.01)
*H04W 28/02* (2009.01)
*H04W 80/10* (2009.01)
*H04W 88/06* (2009.01)

(52) U.S. Cl.
CPC .......... *H04W 76/10* (2018.02); *H04W 80/10* (2013.01); *H04W 88/06* (2013.01)

(56) References Cited

U.S. PATENT DOCUMENTS

| | | | |
|---|---|---|---|
| 2014/0169299 A1* | 6/2014 | Wang | H04L 5/0096 370/329 |
| 2015/0036638 A1 | 2/2015 | Zisimopoulos et al. | |
| 2016/0021592 A1* | 1/2016 | Vesely | H04L 41/0816 370/331 |
| 2016/0044683 A1 | 2/2016 | Xue et al. | |
| 2018/0212710 A1* | 7/2018 | Ronneke | H04W 88/16 |
| 2018/0249373 A1* | 8/2018 | Castro Castro | H04W 28/08 |
| 2019/0069199 A1* | 2/2019 | Yan | H04W 28/0268 |

FOREIGN PATENT DOCUMENTS

| | | |
|---|---|---|
| CN | 104955109 A | 9/2015 |
| CN | 106921585 A | 7/2017 |

\* cited by examiner

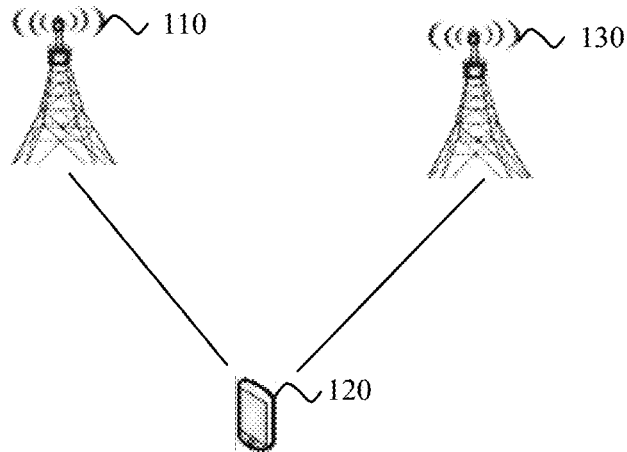

FIG. 1

A first network device obtains an SN-session-AMBR of a PDU session, where the SN-session-AMBR is an AMBR of a flow that is served by a second network device in the PDU session, the first network device is a master node serving a terminal, and the second network device is a secondary node serving the terminal ~ S210

The first network device sends first information to the second network device, where the first information includes the SN-session-AMBR, so that the second network device provides, based on the SN-session-AMBR, a PDU session service for the terminal ~ S220

FIG. 2

COMMUNICATION METHOD, NETWORK DEVICE, AND TERMINAL

CROSS-REFERENCE TO RELATED APPLICATIONS

This application is a continuation of International Application No. PCT/CN2018/106629, filed on Sep. 20, 2018, which claims priority to Chinese Patent Application No. 201710885236.1, filed on Sep. 26, 2017. The disclosures of the aforementioned applications are hereby incorporated by reference in their entireties.

TECHNICAL FIELD

This application relates to the communications field, and more particularly, to a communication method, a network device, and a terminal.

BACKGROUND

In a dual connectivity (DC) scenario, a radio access network (RAN) element that serves a terminal may include a master node (MN) and a secondary node (SN).

For example, in a dual connectivity scenario of a new radio (NR) system and an NR system, both the MN and the SN are NR base stations; or in a dual connectivity scenario of an NR system and a long term evolution (LTE) system, the MN is an LTE base station, and the SN is an NR base station; or in a dual connectivity scenario of an NR system and an LTE system, the MN is an NR base station, and the SN is an LTE base station.

In the dual connectivity scenario, for a protocol data unit (PDU) session of the terminal, in QoS flows included in the PDU session, some QoS flows may be served by the MN, and some QoS flows may be served by the SN.

Regardless of a manner in which a QoS flow in a PDU session of the terminal is served by the MN and the SN, it should be ensured that a sum of non-guaranteed bit rates (non-GBR) of QoS flows in the PDU session is less than or equal to a bit rate threshold. The bit rate threshold is a session-aggregate maximum bit rate (session-AMBR).

In the dual connectivity scenario, how the master node and the secondary node ensure the session-AMBR of the PDU session is a problem that needs to be resolved.

SUMMARY

This application provides a communication method, a network device, and a terminal, to help ensure a session-level aggregate maximum rate requirement in a dual connectivity scenario.

According to a first aspect, this application provides a communication method. The communication method includes: obtaining, by a first network device, a first AMBR of a PDU session, where the first AMBR is an AMBR of a flow that is served by a second network device in the PDU session, the first network device is a master node serving a terminal, and the second network device is a secondary node serving the terminal; and sending, by the first network device, first information to the second network device, where the first information includes the first AMBR, so that the second network device provides, based on the first AMBR, a PDU session service for the terminal.

In the communication method, the first network device sends, to the second network device, the first AMBR of the flow that is served by the second network device in the PDU session, so that the second network device can provide, based on the first AMBR, an uplink flow or downlink flow service in the PDU session for the terminal, thereby ensuring an AMBR of the PDU session of the terminal.

In one embodiment, the communication method further includes: obtaining, by the first network device, a second AMBR of the PDU session, where the second AMBR is an AMBR of a flow that is served by the first network device in the PDU session; and providing, by the first network device based on the second AMBR, the PDU session service for the terminal.

In the communication method, the first network device can provide, based on the second AMBR, the PDU session service for the terminal, so that the AMBR of the PDU session of the terminal can be ensured.

In one embodiment, the communication method further includes: sending, by the first network device, second information to the terminal, where the second information includes the second AMBR, so that the terminal performs, based on the second AMBR, the PDU session with the first network device.

In one embodiment, the communication method further includes: sending, by the first network device, the first information to the terminal, so that the terminal performs, based on the first AMBR, the PDU session with the second network device.

In one embodiment, the communication method further includes: receiving, by the first network device, third information from the second network device, where the third information is used to request the first AMBR.

In one embodiment, the communication method further includes: receiving, by the first network device, fourth information from the terminal, where the fourth information is used to request the first AMBR and the second AMBR.

According to a second aspect, this application provides a communication method. The communication method includes: receiving, by a second network device, first information, where the first information includes a first AMBR of a PDU session, the first AMBR is an AMBR of a flow that is served by the second network device in the PDU session, and the second network device is a secondary node serving a terminal; and providing, by the second network device based on the first AMBR, a PDU session service for the terminal.

In the communication method, the second network device provides, based on the first AMBR, the PDU session service for the terminal, to help ensure an AMBR of a PDU session in a dual connectivity scenario.

In one embodiment, the communication method further includes: sending, by the second network device, third information to a first network device, where the third information is used to request the first AMBR, and the first network device is a master node serving the terminal.

According to a third aspect, this application provides a communication method. The communication method includes: receiving, by a terminal, first information, where the first information includes a first AMBR of a PDU session, the first AMBR is an AMBR of a flow that is served by a second network device in the PDU session, and the second network device is a secondary node serving the terminal; and performing, by the terminal based on the first AMBR, the PDU session with the second network device.

In the communication method, the terminal receives the first information from a first network device or the second network device, and can perform, based on the first AMBR in the first information, the PDU session with the second network device, so that an AMBR of the PDU session of the terminal can be ensured.

In one embodiment, the communication method further includes: receiving, by the terminal, second information sent by a first network device, where the second information includes a second AMBR of the PDU session, the second AMBR is an AMBR of a flow that is served by the first network device in the PDU session, and the first network device is a master node serving the terminal; and performing, by the terminal based on the second AMBR, the PDU session with the first network device.

In one embodiment, the performing, by the terminal based on the first AMBR, the PDU session with the second network device includes: limiting, by the terminal, an actual bit rate of the flow that is served by the second network device in the PDU session to be less than or equal to the first AMBR; and the performing, by the terminal based on the second AMBR, the PDU session with the first network device includes: limiting, by the terminal, an actual bit rate of the flow that is served by the first network device in the PDU session to be less than or equal to the second AMBR.

In one embodiment, the performing, by the terminal based on the second AMBR, the PDU session with the first network device includes: when the terminal determines that a volume of data buffered in the PDU session is less than or equal to a data volume threshold determined based on the second AMBR, performing, by the terminal, data transmission of the PDU session by using only the first network device, and sending an uplink buffer status report (UL BSR) to the first network device, where the UL BSR includes the volume of the buffered data.

In one embodiment, the performing, by the terminal based on the second AMBR, the PDU session with the first network device includes: when the terminal determines that a volume of data buffered in the PDU session is greater than a data volume threshold determined based on the second AMBR, sending, by the terminal, a UL BSR to the first network device and the second network device, and performing data transmission of the PDU session by using the first network device and the second network device, where the UL BSR includes the volume of the buffered data.

In one embodiment, the communication method further includes: sending, by the terminal, fourth information to the first network device, where the fourth information is used to request the first AMBR and the second AMBR.

In one embodiment, the fourth information may include an AMBR of the PDU session that the terminal expects the first network device to determine for the second network device and an AMBR of the PDU session that the terminal expects the first network device to determine for the first network device, so that the first network device determines, based on the AMBRs in the fourth information, the second AMBR for the first network device and the first AMBR for the second network device.

According to a fourth aspect, this application provides a network device. The network device includes a module configured to perform the communication method according to any one of the first aspect or the embodiments of the first aspect. The module included in the network device may be implemented by at least software or hardware.

According to a fifth aspect, this application provides a network device. The network device includes a module configured to perform the communication method according to any one of the second aspect or the embodiments of the second aspect. The module included in the network device may be implemented by at least software or hardware.

According to a sixth aspect, this application provides a terminal. The terminal includes a module configured to perform the communication method according to any one of the third aspect or the embodiments of the third aspect. The module included in the terminal may be implemented by at least software or hardware.

According to a seventh aspect, this application provides a network device. The network device includes a processor, a transmitter, and a receiver. The processor is configured to execute a program. When the processor executes code, the processor, the transmitter, and the receiver implement the communication method according to any one of the first aspect or the embodiments of the first aspect.

In one embodiment, the network device may further include a memory, and the memory is configured to store the code executed by the processor.

According to an eighth aspect, this application provides a network device. The network device includes a processor, a transmitter, and a receiver. The processor is configured to execute a program. When the processor executes code, the processor, the transmitter, and the receiver implement the communication method according to any one of the second aspect or the embodiments of the second aspect.

In one embodiment, the network device may further include a memory, and the memory is configured to store the code executed by the processor.

According to a ninth aspect, this application provides a terminal. The terminal includes a processor, a transmitter, and a receiver. The processor is configured to execute a program. When the processor executes code, the processor, the transmitter, and the receiver implement the communication method according to any one of the third aspect or the embodiments of the third aspect.

In one embodiment, the terminal may further include a memory, and the memory is configured to store the code executed by the processor.

According to a tenth aspect, this application provides a computer-readable storage medium. The computer-readable storage medium stores program code executed by a network device. The program code includes an instruction used to perform the communication method according to any one of the first aspect or the embodiments of the first aspect.

According to an eleventh aspect, this application provides a computer-readable storage medium. The computer-readable storage medium stores program code executed by a network device. The program code includes an instruction used to perform the communication method according to any one of the second aspect or the embodiments of the second aspect.

According to a twelfth aspect, this application provides a computer-readable storage medium. The computer-readable storage medium stores program code executed by a terminal. The program code includes an instruction used to perform the communication method according to any one of the third aspect or the embodiments of the third aspect.

According to a thirteenth aspect, this application provides a computer program product that includes an instruction. When the computer program product is run on a network device, the network device is enabled to perform the communication method according to any one of the first aspect or the embodiments of the first aspect.

According to a fourteenth aspect, this application provides a computer program product that includes an instruction. When the computer program product is run on a network device, the network device is enabled to perform the communication method according to any one of the second aspect or the embodiments of the second aspect.

According to a fifteenth aspect, this application provides a computer program product that includes an instruction. When the computer program product is run on a terminal, the terminal is enabled to perform the communication method according to any one of the third aspect or the embodiments of the third aspect.

According to a sixteenth aspect, this application provides a chip system. The chip system includes a processor, configured to support a network device or a terminal in implementing functions in the foregoing corresponding aspects, for example, generating or processing information in the foregoing communication method.

In one embodiment, the chip system further includes a memory, and the memory is configured to store a program instruction and data that are for the network device or the terminal. The chip system may include a chip, or may include a chip and another discrete component.

BRIEF DESCRIPTION OF DRAWINGS

FIG. 1 is a schematic diagram of a system architecture of an application scenario to which a communication method according to an embodiment of this application may be applied;

FIG. 2 is a schematic flowchart of a communication method according to an embodiment of this application;

DESCRIPTION OF EMBODIMENTS

Figure 3:
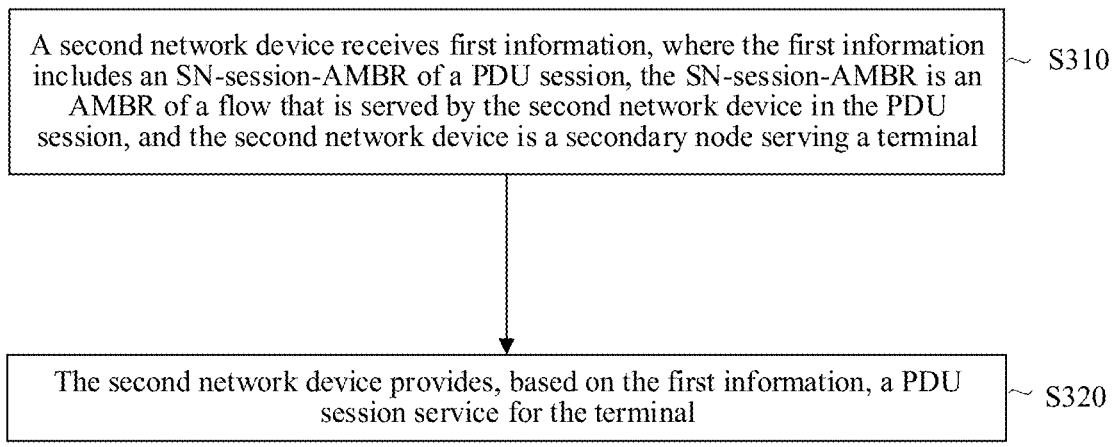
FIG. 3 is a schematic flowchart of a communication method according to another embodiment of this application.

The following describes technical solutions of this application with reference to accompanying drawings.

FIG. 1 is a schematic diagram of a system architecture of a dual connectivity scenario to which a communication method according to an embodiment of this application may be applied. The dual connectivity scenario shown in FIG. 1 may include a network device 110, a network device 130, and a terminal 120.

It should be understood that the embodiments of this application are not limited to the system architecture shown in FIG. 1. In addition, the apparatus in FIG. 1 may be hardware, or may be software obtained through function division, or a combination thereof.

The network device 110 and the network device 130 may be radio access network (RAN) devices. For example, the network device 110 and the network device 130 may be base stations (BS).

The base station may also be referred to as a base station device, is a device that connects a terminal to a wireless network, and includes but is not limited to: a transmission reception point (TRP), a 5G NodeB (gNB), an evolved NodeB (eNB), a radio network controller (RNC), a NodeB (NB), a base station controller (BSC), a base transceiver station (BTS), a home NodeB (for example, a home evolved NodeB or home NodeB, HNB), a baseband unit (BBU), a Wi-Fi access point (AP), a small cell device (pico), or the like.

It should be understood that a type of the base station is not limited in the embodiments of this application. In systems using different radio access technologies, names of devices having functions of the base station may be different. For ease of description, in all the embodiments of this application, all the foregoing apparatuses that provide a wireless communication function for the terminal are referred to as a base station.

The terminal 120 may be user equipment (UE). The terminal 120 may communicate with one or more core networks (CN) by using the network device 110. The terminal may be referred to as an access terminal, a terminal device, a subscriber unit, a subscriber station, a mobile station, a mobile station, a remote station, a remote terminal, a mobile device, a user terminal, a radio network device, a user agent or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the internet of things or the internet of vehicles, any form of terminal device in a future network, and the like.

The network device 110 is a master node that provides a PDU session service for the terminal 120, and the network device 130 is a secondary node that provides the PDU session service for the terminal 120.

When the network device 110 and the network device 130 are base stations, the network device 110 may be referred to as a master base station; and the network device 130 may be referred to as a secondary base station.

The terminal 120 may correspond to a UE-AMBR. In one embodiment, a sum of bit rates of all non-GBR QoS flows of the terminal 120 should be less than or equal to the UE-AMBR. In other words, a sum of bit rates of all non-GBR QoS flows in all PDU sessions corresponding to the terminal should be less than or equal to the UE-AMBR.

One PDU session corresponds to one session aggregate maximum bit rate (Session-AMBR), and the session-AMBR is used to limit aggregate bit rates of all non-GBR QoS flows in the corresponding PDU session.

In a PDU session, an AMBR limit of a non-GBR QoS flow that is served by a master node (the network device 110) may be referred to as an MN-session-AMBR. In the PDU session, an AMBR limit of a non-GBR QoS flow that is served by a secondary node (the network device 130) may be referred to as an SN-session-AMBR.

It should be understood that, in the embodiments of this application, a meaning of the flow that is served by the master node includes: The master node directly forwards a downlink flow in the PDU session from a core network element to the terminal, or directly forwards an uplink flow in the PDU session of the terminal from the terminal to a core network element. In the embodiments of this application, a meaning of the flow that is served by the secondary node includes: The secondary node directly forwards a downlink flow from a core network element to the terminal, or the secondary node directly forwards an uplink flow of the terminal from the terminal to a core network element.

It should be understood that, for ease of description, a flow in the following corresponds to a non-GBR QoS flow, an uplink flow in the following corresponds to an uplink non-GBR QoS flow, and a downlink flow in the following corresponds to a downlink non-GBR QoS flow.

In this application, the SN-session-AMBR is also referred to as a first AMBR, and the MN-session-AMBR is also referred to as a second AMBR.

A session-AMBR of a PDU session includes at least an MN-session-AMBR of the PDU session or an SN-session-AMBR of the PDU session. The session-AMBR of the PDU session may be ensured by ensuring at least the MN-session-AMBR or the SN-session-AMBR.

This application provides a communication method for ensuring a session-AMBR of a PDU session. The following describes various communication methods in the embodiments of this application.

FIG. 2 is a schematic flowchart of a communication method according to an embodiment of this application. It should be understood that FIG. 2 shows operations of the communication method, but these operations are merely examples. In this embodiment of this application, other operations or variants of the operations in FIG. 2 may alternatively be performed. The communication method shown in FIG. 2 may include S210 and S220.

S210. A first network device obtains an SN-session-AMBR of a PDU session, where the SN-session-AMBR is an AMBR of a flow that is served by a second network device in the PDU session, the first network device is a master node serving a terminal, and the second network device is a secondary node serving the terminal.

The first network device may be the network device 110 in FIG. 1, the second network device may be the network device 130 in FIG. 1, and the terminal may be the terminal 120 in FIG. 1.

The SN-session-AMBR may be an AMBR of an uplink flow in the PDU session, or may be an AMBR of a downlink flow in the PDU session.

The SN-session-AMBR should be less than or equal to a session-AMBR of the PDU session.

One embodiment, in which the first network device obtains the SN-session-AMBR includes: The first network device receives the SN-session-AMBR from a core network element. An example of the core network element is a session management function (SMF) network element, and another example is an access and mobility management function (AMF).

One embodiment, in which the first network device obtains the SN-session-AMBR includes: The first network device determines the SN-session-AMBR.

When determining the SN-session-AMBR, the first network device may determine, based on information such as a load status of the first network device or a parameter (for example, a flow priority) of a flow in the PDU session, which flows in the PDU session are served by the second network device, and determine AMBRs of the flows that are served by the second network device.

For example, when the first network device is nearly overloaded, the first network device may allocate all flows in the PDU session to the second network device, that is, all the flows in the PDU session are served by the second network device. In this case, the SN-session-AMBR determined by the first network device is equal to the session-AMBR of the PDU session. For another example, when load of the first network device is relatively light, the first network device may allocate flows with relatively high priorities in the PDU session to the first network device, and allocate flows with relatively low priorities to the second network device. That is, some flows in the PDU session are served by the second network device. In this case, the SN-session-AMBR determined by the first network device is less than the session-AMBR of the PDU session.

S220. The first network device sends first information to the second network device, where the first information includes the SN-session-AMBR, so that the second network device provides, based on the SN-session-AMBR, a PDU session service for the terminal.

In one embodiment, the first information may be carried in a secondary node addition request (SN Addition Request) message or a secondary node modification request (SN Modification Request) message.

In one embodiment, the first network device sends the SN-session-AMBR of the PDU session to the second network device, and the second network device provides, based on the SN-session-AMBR indicated by the first network device, the PDU session service for the terminal, thereby ensuring the SN-session-AMBR of the PDU session.

In S220, the first information may further include a session identifier (PDU session ID) of the PDU session.

In one embodiment, the communication method shown in FIG. 2 may further include: The first network device obtains an MN-session-AMBR, where the MN-session-AMBR is an AMBR of a flow that is served by the first network device in the PDU session.

One embodiment, in which the first network device obtains the MN-session-AMBR includes: The first network device receives the MN-session-AMBR from the core network element.

An example of the core network element is an SMF network element, and another example is an AMF network element.

One embodiment, in which the first network device obtains the MN-session-AMBR includes: The first network device determines the MN-session-AMBR.

For example, when determining the SN-session-AMBR, the first network device may further determine the MN-session-AMBR.

Like the SN-session-AMBR, the MN-session-AMBR may be an AMBR of an uplink flow in the PDU session, or may be an AMBR of a downlink flow in the PDU session.

After obtaining the MN-session-AMBR, the first network device may further perform the following operation: The first network device provides, based on the MN-session-AMBR, the PDU session service for the terminal.

The providing, by the first network device based on the MN-session-AMBR, the PDU session service for the terminal may include: The first network device limits a bit rate that is of a flow in the PDU session and that is on the first network device to be less than or equal to the MN-session-AMBR.

In this case, the first network device and the second network device jointly provide the PDU session service for the terminal, to ensure the session-AMBR of the PDU session.

In the communication method shown in FIG. 2, in one embodiment, when the MN-session-AMBR is the AMBR of the uplink flow in the PDU session, the first network device may further send second information to the terminal. The second information includes the MN-session-AMBR, so that the terminal performs, based on the MN-session-AMBR in the second information, the PDU session with the first network device.

In one embodiment, the second information may be carried in a radio resource control (RRC) connection message.

In the communication method shown in FIG. 2, in one embodiment, when the SN-session-AMBR is the AMBR of the uplink flow in the PDU session, the first network device may further send the first information to the terminal, so that the terminal performs, based on the SN-session-AMBR in the first information, the PDU session with the second network device.

The first network device may directly send the first information to the terminal by using an RRC message; or may first send the first information to the second network device, and then the second network device sends the first information to the terminal by using an RRC message.

In one embodiment, the first information and the second information that are sent by the first network device to the terminal may be carried in a same RRC message.

In the communication method shown in FIG. 2, in one embodiment, the first network device may determine an MN-session-AMBR and an SN-session-AMBR of each of a plurality of PDU sessions. The MN-session-AMBR and the SN-session-AMBR of each PDU session may be in any one of the following cases: Both the MN-session-AMBR and the SN-session-AMBR are greater than 0, and a sum of the MN-session-AMBR and the SN-session-AMBR is equal to the session-AMBR of the PDU session; and the SN-session-AMBR is equal to the session-AMBR of the PDU session, and the MN-session-AMBR is equal to 0. Any two PDU sessions may have different MN-session-AMBRs and different SN-session-AMBRs.

The first network device may send, for each PDU session, a message including an SN-session-AMBR. In this case, each message may further include a corresponding PDU session identifier, to distinguish a PDU session whose SN-session-AMBR is included in the message.

Alternatively, the first network device may add SN-session-AMBRs of a plurality of PDU sessions to one message, and may further add identifiers of the PDU sessions to the message, to distinguish between the SN-session-AMBRs of the PDU sessions.

Similarly, the second network device may also send, for each PDU session, a message including an SN-session-AMBR, or may add SN-session-AMBRs of a plurality of PDU sessions to one message.

FIG. 3 is a schematic flowchart of a communication method according to another embodiment of this application. It should be understood that FIG. 3 shows operations of the communication method, but these operations are merely examples. In this embodiment of this application, other operations or variants of the operations in FIG. 3 may further be performed. The communication method shown in FIG. 3 includes S310 and S320.

S310. A second network device receives first information, where the first information includes an SN-session-AMBR of a PDU session, the SN-session-AMBR is an AMBR of a flow that is served by the second network device in the PDU session, and the second network device is a secondary node serving a terminal.

The SN-session-AMBR may be an AMBR of an uplink flow in the PDU session, or may be an AMBR of a downlink flow in the PDU session.

One embodiment, in which the second network device receives the first information is as follows: The second network device receives the first information from a first network device, where the first network device is a master node serving the terminal.

One embodiment, in which the second network device receives the first information is as follows: The second network device receives the first information from a core network element. An example of the core network element is an SMF network element, and another example is an AMF network element.

S320. The second network device provides, based on the first information, a PDU session service for the terminal.

The providing, by the second network device based on the first information, a PDU session service for the terminal may include: The second network device ensures that an actual bit rate of a flow in the PDU session is less than or equal to the SN-session-AMBR.

In one embodiment, when the SN-session-AMBR is the AMBR of the uplink flow, the second network device may further send the first information to the terminal, so that the terminal performs, based on the first information, the PDU session with the second network device.

In one embodiment, the first information sent by the second network device to the terminal may be carried in an RRC message.

The second network device in the communication method shown in FIG. 3 may be the second network device in the communication method shown in FIG. 2. Technical features related to the second network device in the communication method shown in FIG. 2 are also applicable to the second network device in the communication method shown in FIG. 3. Details are not described herein to avoid repetition.

Figure 4:
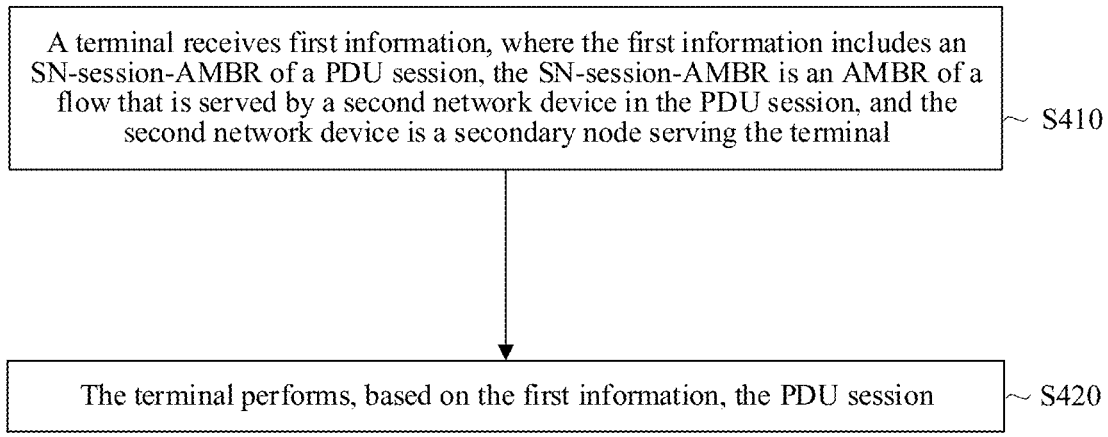
FIG. 4 is a schematic flowchart of a communication method according to another embodiment of this application.

FIG. 4 is a schematic flowchart of a communication method according to another embodiment of this application. It should be understood that FIG. 4 shows operations of the communication method, but these operations are merely examples. In this embodiment of this application, other operations or variants of the operations in FIG. 4 may further be performed.

The communication method shown in FIG. 4 may include S410 and S420.

S410. A terminal receives first information, where the first information includes an SN-session-AMBR of a PDU session, the SN-session-AMBR is an AMBR of a flow that is served by a second network device in the PDU session, and the second network device is a secondary node serving the terminal.

The SN-session-AMBR may be an AMBR of an uplink flow in the PDU session.

One embodiment, in which the terminal receives the first information is as follows: The terminal receives the first information from a first network device, and the first network device is a master node serving the terminal.

In one embodiment, the first information received by the terminal from the first network device may be carried in an RRC message.

One embodiment, in which the terminal receives the first information is as follows: The terminal receives the first information from the second network device.

In one embodiment, the first information received by the terminal from the second network device may be carried in an RRC message.

One embodiment, in which the terminal receives the first information is as follows: The terminal receives the first information from a core network element. An example of the core network element is an SMF network element, and another example is an AMF network element.

S420. The terminal performs, based on the SN-session-AMBR, the PDU session with the second network device.

In one embodiment, the performing, by the terminal based on the SN-session-AMBR, the PDU session may include: The terminal limits an actual bit rate of an uplink flow that is served by the second network device in the PDU session to be less than or equal to the SN-session-AMBR.

In one embodiment, the communication method shown in FIG. 4 may further include: The terminal receives second information, where the second information includes an MN-session-AMBR of the PDU session. Correspondingly, S420 may further include: The terminal performs, based on the MN-session-AMBR in the second information, the PDU session with the first network device.

The MN-session-AMBR may be an AMBR of an uplink flow in the PDU session.

One embodiment, in which the terminal receives the second information is as follows: The terminal receives the second information from the first network device.

In one embodiment, the second information received by the terminal from the first network device may be carried in an RRC message.

In one embodiment, the first information and the second information that are received by the terminal from the first network device may be carried in a same RRC message.

One embodiment, in which the terminal receives the second information is as follows: The terminal receives the second information from the core network element. An example of the core network element is an SMF network element, and another example is an AMF network element.

In one embodiment, the performing, by the terminal based on the MN-session-AMBR, the PDU session may include: The terminal limits an actual bit rate of an uplink flow that is served by the first network device in the PDU session to be less than or equal to the MN-session-AMBR.

In one embodiment, the performing, by the terminal based on the MN-session-AMBR, the PDU session may include: When the terminal determines that a volume of data buffered in the PDU session is less than or equal to a data volume threshold determined based on the MN-session-AMBR, the terminal performs data transmission of the PDU session by using only the first network device, and sends a UL BSR to the first network device.

In one embodiment, the performing, by the terminal based on the MN-session-AMBR, the PDU session may include: When the terminal determines that a volume of data buffered in the PDU session is greater than a data volume threshold determined based on the MN-session-AMBR, the terminal sends a UL BSR to the first network device and the second network device, and performs data transmission of the PDU session by using the first network device and the second network device.

One embodiment, in which the terminal determines, based on the MN-session-AMBR, the data volume threshold may include: The terminal receives an average time window from the first network device or the second network device, calculates a product of the average time window and the MN-session-AMBR, and uses the product as the data volume threshold.

In one embodiment, the volume of the buffered data may include a data volume in a buffer of a service data adaptation protocol (SDAP) layer, a data volume in a buffer of a packet data convergence protocol (PDCP) layer of the PDU session, or a data volume in a buffer of a radio link control (RLC) layer of the PDU session.

Figure 5:
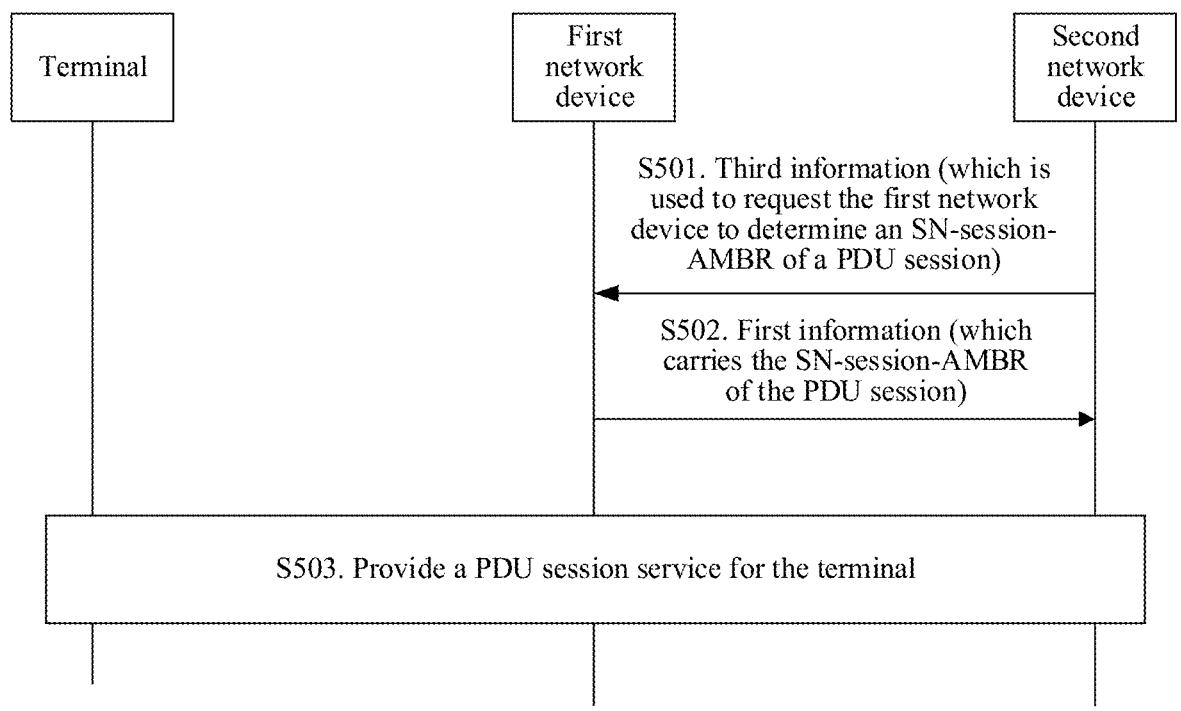
FIG. 5 is a schematic interactive flowchart of a communication method according to an embodiment of this application.

FIG. 5 is a schematic interactive flowchart of a communication method according to another embodiment of this application. It should be understood that FIG. 5 shows operations of the communication method, but these operations are merely examples. In this embodiment of this application, other operations or variants of the operations in FIG. 5 may further be performed. In addition, the operations in FIG. 5 may be performed in a sequence different from that shown in FIG. 5, and possibly, not all the operations in FIG. 5 need to be performed.

S501. A second network device sends third information to a first network device. The third information is used to request the first network device to determine an SN-session-AMBR of a PDU session. Correspondingly, the first network device receives the third information.

For example, the first network device sends first information to the second network device, so that after the second network device provides, based on the first information, a PDU session service for a terminal, when the second network device determines that an SN-session-AMBR (which may be an SN-session-AMBR of an uplink flow or a downlink flow) in the first information is inappropriate, the second network device may send the third information to the first network device, to request the first network device to re-determine the SN-session-AMBR of the PDU session.

An example in which the second network device determines that the SN-session-AMBR in the first information is inappropriate is as follows: The SN-session-AMBR is less than an actual bit rate that is of the PDU session and that is on the second network device.

A manner in which the second network device calculates the actual bit rate of the PDU session is as follows: The second network device calculates, based on an average window, the actual bit rate. The average window may be configured on the second network device, or may be obtained by the second network device from the first network device, or may be obtained by the second network device from a core network element.

In one embodiment, the third information may be carried in a secondary node modification required (SN Modification Required) message.

After receiving the third information, the first network device may determine, based on the request of the third information, the SN-session-AMBR of the PDU session. In this case, the first network device may also determine an MN-session-AMBR of the PDU session.

In one embodiment, the third information may include an SN-session-AMBR that the second network device expects the first network device to determine for the second network device. The SN-session-AMBR expected by the second network device may be the actual bit rate, of the PDU session, that is on the second network device and that is obtained by the second network device through calculation.

In this case, the first network device may determine, based on the SN-session-AMBR expected by the second network device and a session-AMBR of the PDU session, a final SN-session-AMBR of the second network device. For example, when the SN-session-AMBR expected by the second network device is less than or equal to the session-AMBR of the PDU session, the first network device may determine the SN-session-AMBR expected by the second network device as the final SN-session-AMBR of the second network device.

In one embodiment, before the first network device receives, from the second network device, the SN-session-AMBR expected by the second network device, the first network device may send an SN-session-AMBR threshold to the second network device, so that the second network device can determine, based on the SN-session-AMBR threshold, the SN-session-AMBR expected by the second network device.

For example, the first network device may send a maximum SN-session-AMBR threshold to the second network device. In this case, the expected SN-session-AMBR determined by the second network device should be less than or equal to the maximum SN-session-AMBR threshold. In this case, when the maximum SN-session-AMBR threshold sent by the first network device to the second network device is less than or equal to the session-AMBR of the PDU session, the first network device may determine the SN-session-AMBR expected by the second network device as the final SN-session-AMBR.

For another example, the first network device may send a minimum SN-session-AMBR threshold to the second network device. In this case, the expected SN-session-AMBR determined by the second network device should be greater than or equal to the minimum SN-session-AMBR threshold. In this case, when the SN-session-AMBR expected by the second network device is less than or equal to the session-AMBR of the PDU session, the first network device may determine the SN-session-AMBR expected by the second network device as the final SN-session-AMBR of the second network device.

Alternatively, after receiving the third information, the first network device may obtain, based on the request of the third information, the SN-session-AMBR of the PDU session from the core network element.

S502. The first network device sends first information to the second network device. The first information includes the SN-session-AMBR that is of the PDU session and that is determined by the first network device.

Correspondingly, the second network device receives the first information.

S503. The first network device provides, based on the MN-session-AMBR, and the second network device provides, based on the SN-session-AMBR, the PDU session service for the terminal when both the MN-session-AMBR and the SN-session-AMBR that are of the PDU session are greater than 0.

When the SN-session-AMBR of the PDU session is equal to the session-AMBR of the PDU session, the second network device independently provides the PDU session service for the terminal. In this case, the MN-session-AMBR may be 0.

The SN-session-AMBR and the MN-session-AMBR may be AMBRs of an uplink flow, or may be AMBRs of a downlink flow.

When the SN-session-AMBR and the MN-session-AMBR are the AMBRs of the uplink flow, the first network device may send the SN-session-AMBR and the MN-session-AMBR to the terminal, so that the terminal can perform, based on the SN-session-AMBR and the MN-session-AMBR, the PDU session. In one embodiment, the first network device sends the MN-session-AMBR to the terminal, and the second network device sends the SN-session-AMBR to the terminal.

For the foregoing operations in FIG. 5, refer to related operations in the communication method shown in FIG. 2. For brevity, details are not described herein again.

Figure 6:
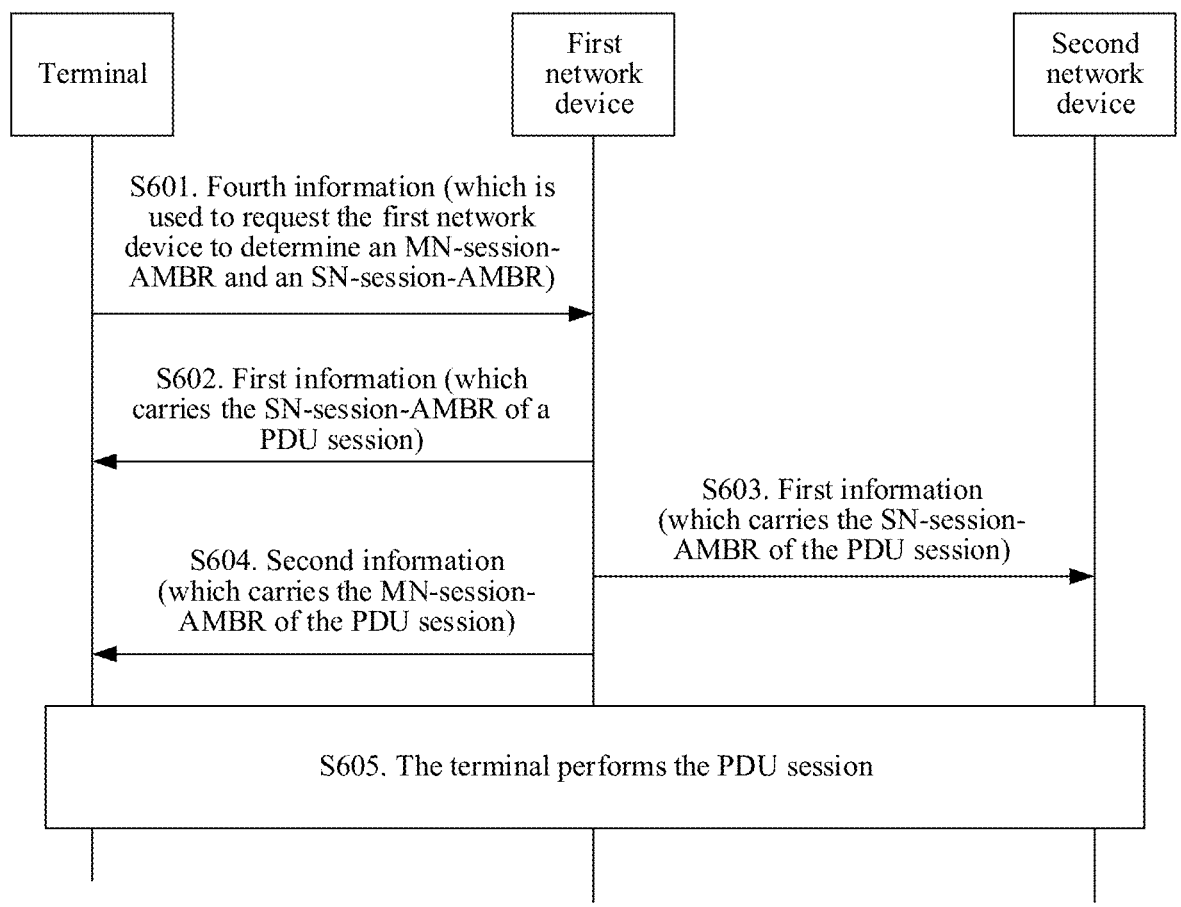
FIG. 6 is a schematic interactive flowchart of a communication method according to another embodiment of this application.

FIG. 6 is a schematic interactive flowchart of a communication method according to another embodiment of this application. It should be understood that FIG. 6 shows operations of the communication method, but these operations are merely examples. In this embodiment of this application, other operations or variants of the operations in FIG. 6 may further be performed. In addition, the operations in FIG. 6 may be performed in a sequence different from that shown in FIG. 6, and possibly, not all the operations in FIG. 6 need to be performed.

S601. A terminal sends fourth information to a first network device, where the fourth information is used to request the first network device to determine an MN-session-AMBR and an SN-session-AMBR of a PDU session.

Correspondingly, the first network device receives the fourth information.

The SN-session-AMBR and the MN-session-AMBR of the PDU session may be AMBRs of an uplink flow.

For example, the first network device sends first information and second information to the terminal. When the terminal determines that an SN-session-AMBR in the first information and an MN-session-AMBR in the second information are inappropriate, the terminal may send the fourth information to the first network device, to request the first network device to re-determine the MN-session-AMBR and the SN-session-AMBR of the PDU session.

An example in which the terminal determines that the SN-session-AMBR in the first information is inappropriate is as follows: The SN-session-AMBR is less than an actual bit rate of a PDU session between the terminal and a second network device.

An example in which the terminal determines that the MN-session-AMBR in the second information is inappropriate is as follows: The MN-session-AMBR is less than an actual bit rate of a PDU session between the terminal and the first network device.

After receiving the fourth information, the first network device may determine, based on the request of the fourth information, the MN-session-AMBR and the SN-session-AMBR of the PDU session. Alternatively, the first network device may request, based on the request of the fourth information, the MN-session-AMBR and the SN-session-AMBR of the PDU session from a core network element.

S602. The first network device sends first information to the terminal, where the first information includes the SN-session-AMBR of the PDU session.

Correspondingly, the terminal receives the first information.

S603. The first network device sends the first information to the second network device. Correspondingly, the second network device receives the first information sent by the first network device.

S604. The first network device sends second information to the terminal, where the second information includes the MN-session-AMBR of the PDU session.

Correspondingly, the terminal receives the second information.

S605. The terminal performs, based on the first information, the PDU session by using only the second network device when the MN-session-AMBR of the PDU session in the second information is equal to 0.

When both the SN-session-AMBR of the PDU session in the first information and the MN-session-AMBR of the PDU session in the second information are greater than 0, the terminal performs, based on the first information and the second information, the PDU session by using the first network device and the second network device.

For the foregoing operations in FIG. 6, refer to related operations in the communication method shown in FIG. 2. For brevity, details are not described herein again.

Figure 7:
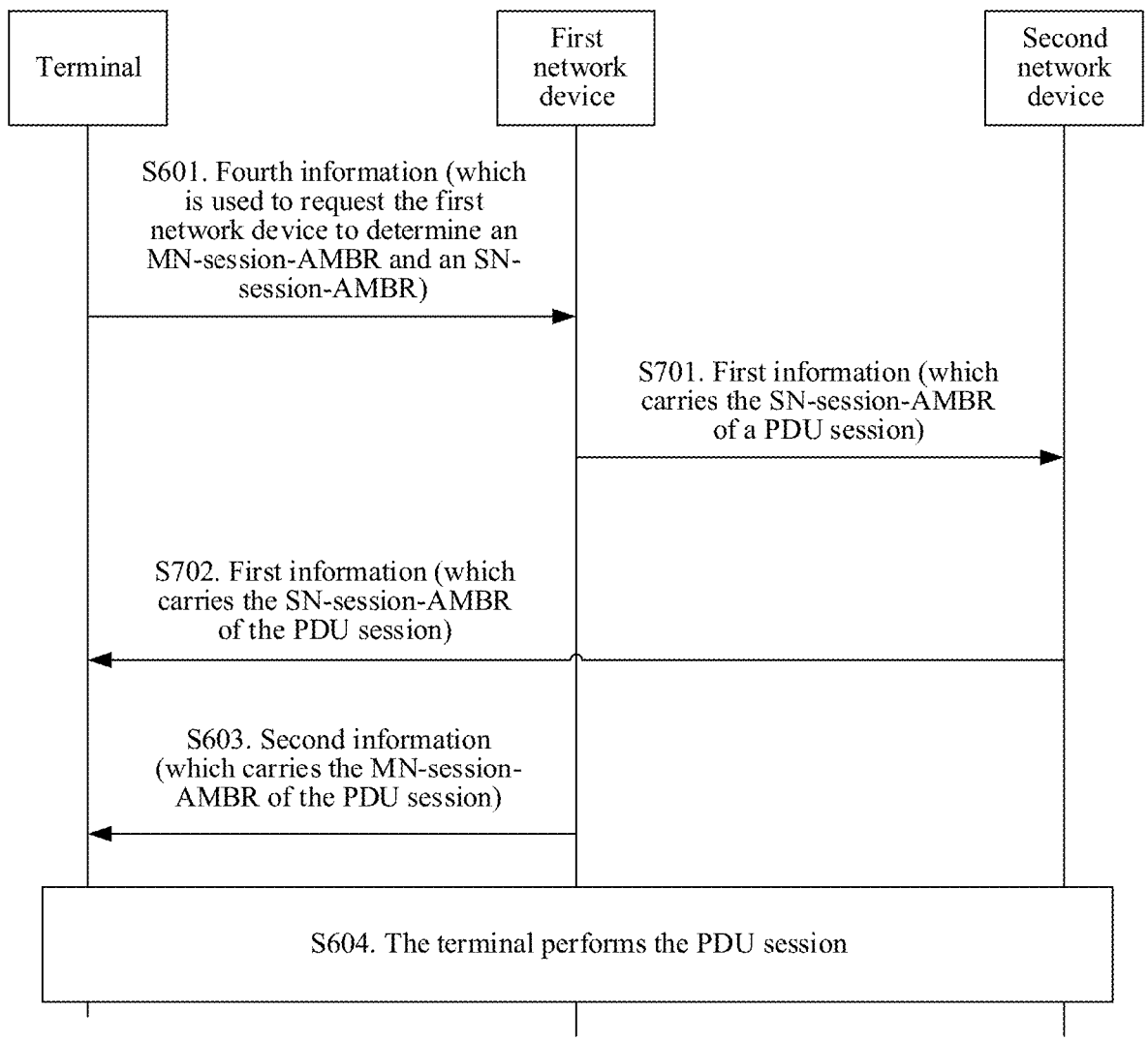
FIG. 7 is a schematic interactive flowchart of a communication method according to another embodiment of this application.

One embodiment, of S602 is S702 in FIG. 7. In FIG. 7, in S701, the first network device sends the first information to the second network device, and the second network device receives the first information. In S702, the second network device sends the first information to the terminal, and the terminal receives the first information.

This application further provides a communication method, and the communication method includes: receiving, by a first network device, fifth information from a second network device, where the fifth information is used to request the first network device to determine a UE-AMBR on the second network device, the first network device is a master node serving a terminal, and the second network device is a secondary node serving the terminal; and sending, by the first network device, sixth information to the second network device, so that the second network device limits, based on the sixth information, the UE-AMBR, where the sixth information includes the UE-AMBR that is on the second network device and that is determined by the first network device.

Correspondingly, this application further provides a communication method, and the communication method includes: sending, by a second network device, fifth information to a first network device, where the fifth information is used to request the first network device to determine a UE-AMBR on the second network device, the first network device is a master node serving a terminal, and the second network device is a secondary node serving the terminal; receiving, by the second network device, sixth information from the first network device, where the sixth information includes the UE-AMBR that is on the second network device and that is determined by the first network device; and limiting, by the second network device based on the sixth information, the UE-AMBR.

The first network devices in the foregoing two communication methods may be the network device 110 in FIG. 1, and the second network devices may be the network device 130 in FIG. 1.

The fifth information may be carried in an SN modification required message, and the sixth information may be carried in an SN modification request message.

In one embodiment, when the UE-AMBR on the second network device is to exceed a limit, the second network device may limit the PDU session even if an actual bit rate that is of the PDU session and that is on the second network device does not exceed an SN-session-AMBR.

For example, when a maximum value of a UE-AMBR that is of a terminal and that is allowed on the second network device is 80 megabits per second (Mbps), the terminal corresponds to two PDU sessions, an SN-session-AMBR of one PDU session is 50 Mbps, and an SN-session-AMBR of the other PDU session is 50 Mbps. If a real-time UE-AMBR on the second network device is to exceed 80 Mbps, the second network device may change the SN-session-AMBRs of the two PDU sessions to 40 Mbps.

Figure 8:
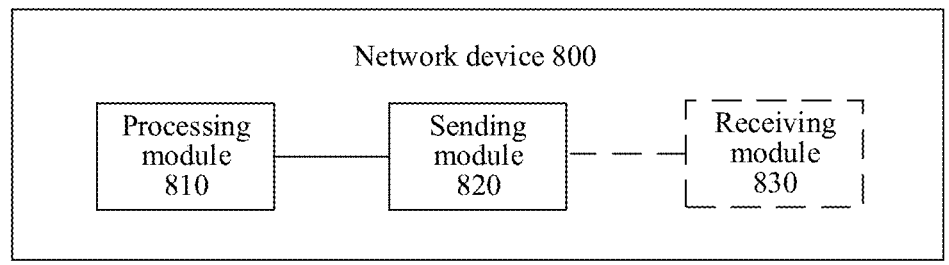
FIG. 8 is a schematic structural diagram of a network device according to an embodiment of this application.

FIG. 8 is a schematic structural diagram of a network device according to an embodiment of this application. It should be understood that a network device 800 shown in FIG. 8 is merely an example. The network device in the embodiments of this application may further include another module or unit, or include modules with functions similar to those of modules in FIG. 8, or may not necessarily include all modules in FIG. 8.

The network device 800 shown in FIG. 8 may include a processing module 810 and a sending module 820. In one embodiment, the network device 800 may further include a receiving module 830.

The processing module 810 is configured to obtain a first AMBR of a PDU session. The first AMBR is an AMBR of a flow that is served by a second network device in the PDU session, the network device 800 is a master node serving a terminal, and the second network device is a secondary node serving the terminal.

The sending module 820 is configured to send first information to the second network device. The first information includes the first AMBR, so that the second network device provides, based on the first AMBR, a PDU session service for the terminal.

In one embodiment, the processing module 810 is further configured to: obtain a second AMBR of the PDU session, where the second AMBR is an AMBR of a flow that is served by the first network device in the PDU session; and provide, based on the second AMBR, the PDU session service for the terminal.

In one embodiment, the sending module 820 is further configured to send second information to the terminal. The second information includes the second AMBR, so that the terminal performs, based on the second AMBR, the PDU session with the first network device.

In one embodiment, the sending module 820 is further configured to send the first information to the terminal, so that the terminal performs, based on the first AMBR, the PDU session with the second network device.

In one embodiment, the receiving module 830 is configured to receive third information from the second network device, and the third information is used to request the first AMBR.

In one embodiment, the receiving module 830 is configured to receive fourth information from the terminal, and the fourth information is used to request the first AMBR and the second AMBR.

It should be understood that the modules included in the network device 800 in FIG. 8 may be configured to implement corresponding operations performed by the first network device in the communication method shown in any one of FIG. 2 to FIG. 7. For brevity, details are not described herein again.

Figure 9:
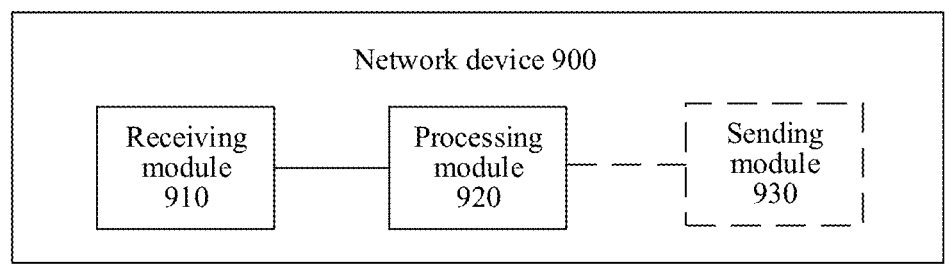
FIG. 9 is a schematic structural diagram of a network device according to another embodiment of this application.

FIG. 9 is a schematic structural diagram of a network device according to an embodiment of this application. It should be understood that a network device 900 shown in FIG. 9 is merely an example. The network device in the embodiments of this application may further include another module or unit, or include modules with functions similar to those of modules in FIG. 9, or may not necessarily include all modules in FIG. 9.

The network device shown in FIG. 9 includes a receiving module 910 and a processing module 920. In one embodiment, the network device 900 may further include a sending module 930.

The receiving module 910 is configured to receive first information. The first information includes a first AMBR of a PDU session, the first AMBR is an AMBR of a flow that is served by the network device 900 in the PDU session, and the second network device is a secondary node serving a terminal.

The processing module 920 is configured to provide, based on the first AMBR, a PDU session service for the terminal.

In one embodiment, the sending module 930 is configured to send third information to a first network device. The third information is used to request the first AMBR, and the first network device is a master node serving the terminal.

In one embodiment, the sending module 930 is configured to send the first information to the terminal, so that the terminal performs, based on the first information, the PDU session with the second network device.

It should be understood that the modules included in the network device 900 in FIG. 9 may be configured to implement corresponding operations performed by the second network device in the communication method shown in any one of FIG. 2 to FIG. 7. For brevity, details are not described herein again.

Figure 10:
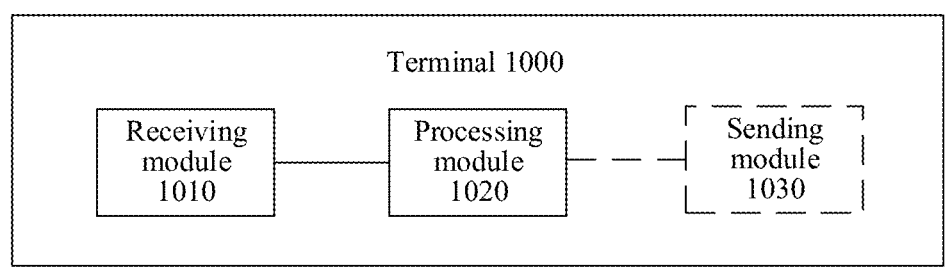
FIG. 10 is a schematic structural diagram of a terminal according to an embodiment of this application.

FIG. 10 is a schematic structural diagram of a terminal according to an embodiment of this application. It should be understood that a terminal 1000 shown in FIG. 10 is merely an example. The terminal in the embodiments of this application may further include another module or unit, or include modules with functions similar to those of modules in FIG. 10, or may not necessarily include all modules in FIG. 10.

The terminal 1000 shown in FIG. 10 includes a receiving module 1010 and a processing module 1020. In one embodiment, the terminal 1000 may further include a sending module 1030.

The receiving module 1010 is configured to receive first information. The first information includes a first AMBR of a PDU session, the first AMBR is an AMBR of a flow that is served by a second network device in the PDU session, and the second network device is a secondary node serving the terminal.

The processing module 1020 is configured to perform, based on the first AMBR, the PDU session with the second network device.

In one embodiment, the receiving module 1010 is further configured to receive second information. The second information includes a second AMBR of the PDU session, the second AMBR is an AMBR of a flow that is served by a first network device in the PDU session, and the first network device is a master node serving the terminal.

Correspondingly, the processing module 1020 is further configured to perform, based on the second AMBR, the PDU session with the first network device.

In one embodiment, the processing module 1020 is configured to: limit an actual bit rate of the flow that is served by the second network device in the PDU session to be less than or equal to the first AMBR; and limit an actual bit rate of the flow that is served by the first network device in the PDU session to be less than or equal to the second AMBR.

In one embodiment, the processing module 1020 is configured to:

when it is determined that a volume of data buffered in the PDU session is less than or equal to a data volume threshold determined based on the second AMBR, perform data transmission of the PDU session by using only the first network device, and send a UL BSR to the first network device, where the UL BSR includes the volume of the buffered data.

In one embodiment, the processing module 1020 is configured to:

when it is determined that a volume of data buffered in the PDU session is greater than a data volume threshold determined based on the second AMBR, send an uplink buffer status report UL BSR to the first network device and the second network device, and perform data transmission of the PDU session by using the first network device and the second network device, where the UL BSR includes the volume of the buffered data.

In one embodiment, the sending module 1030 is configured to send fourth information to the first network device, where the fourth information is used to request the first AMBR and the second AMBR.

It should be understood that the modules included in the terminal 1000 in FIG. 10 may be configured to implement corresponding operations performed by the terminal in the communication method shown in any one of FIG. 2 to FIG. 7. For brevity, details are not described herein again.

Figure 11:
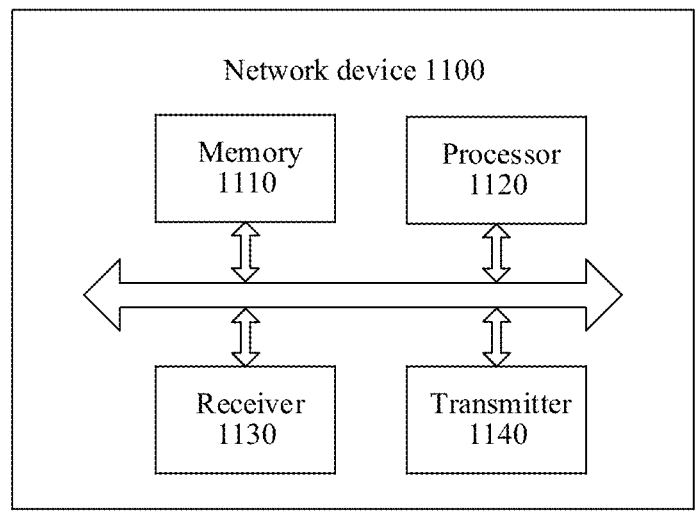
FIG. 11 is a schematic structural diagram of a network device according to another embodiment of this application.

FIG. 11 is a schematic structural diagram of a network device according to an embodiment of this application. It should be understood that a network device 1100 shown in FIG. 11 is merely an example. The network device in the embodiments of this application may further include another module or unit, or include modules with functions similar to those of modules in FIG. 11, or may not necessarily include all modules in FIG. 11.

The network device 1100 shown in FIG. 11 may include a processor 1120 and a transmitter 1140.

In one embodiment, the network device 1100 may further include a receiver 1130. The receiver 1130 and the transmitter 1140 may be integrated together to obtain a transceiver.

In one embodiment, the network device 1100 may further include a memory 1110. The memory 1110 is configured to store program code executed by the processor 1120. The processor 1120 may be integrated with the memory.

The processor 1120 may be configured to implement the operations performed by the processing module 810 in FIG. 8. The transmitter 1140 may be configured to implement the operations performed by the sending module 820 in FIG. 8. The receiver 1130 may be configured to implement the operations performed by the receiving module 830 in FIG. 8.

Figure 12:
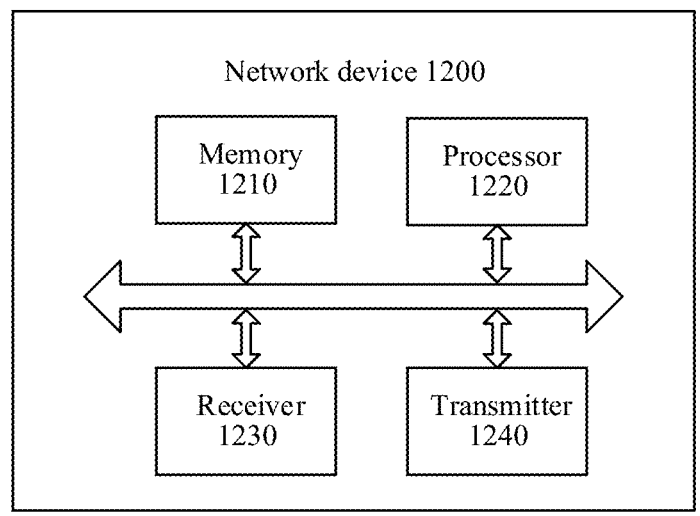
FIG. 12 is a schematic structural diagram of a network device according to another embodiment of this application.

FIG. 12 is a schematic structural diagram of a network device according to an embodiment of this application. It should be understood that a network device 1200 shown in FIG. 12 is merely an example. The network device in the embodiments of this application may further include another module or unit, or include modules with functions similar to those of modules in FIG. 12, or may not necessarily include all modules in FIG. 12.

The network device 1200 shown in FIG. 12 may include a processor 1220 and a receiver 1230.

In one embodiment, the network device 1200 may further include a transmitter 1240. The receiver 1230 and the transmitter 1240 may be integrated together to obtain a transceiver.

In one embodiment, the network device 1200 may further include a memory 1210. The memory 1210 is configured to store program code executed by the processor 1220. The processor 1220 may be integrated with the memory.

The processor 1220 may be configured to implement the operations performed by the processing module 920 in FIG. 9. The receiver 1230 may be configured to implement the operations performed by the receiving module 910 in FIG. 9. The transmitter 1240 may be configured to implement the operations performed by the sending module 930 in FIG. 9.

Figure 13:
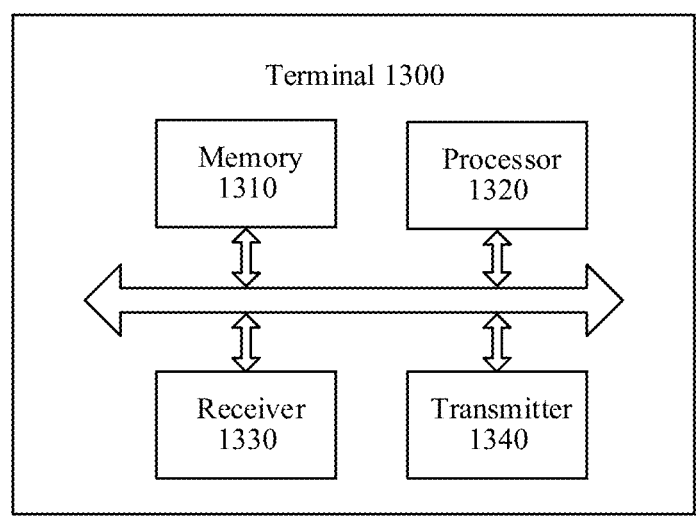
FIG. 13 is a schematic structural diagram of a terminal according to another embodiment of this application.

FIG. 13 is a schematic structural diagram of a terminal according to an embodiment of this application. It should be understood that a terminal 1300 shown in FIG. 13 is merely an example. The terminal in the embodiments of this application may further include another module or unit, or include modules with functions similar to those of modules in FIG. 13, or may not necessarily include all modules in FIG. 13.

The terminal 1300 shown in FIG. 13 may include a processor 1320 and a receiver 1330.

In one embodiment, the terminal 1300 may further include a transmitter 1340. The receiver 1330 and the transmitter 1340 may be integrated together to obtain a transceiver.

In one embodiment, the terminal 1300 may further include a memory 1310. The memory 1310 is configured to store program code executed by the processor 1320. The processor 1320 may be integrated with the memory.

The processor 1320 may be configured to implement the operations performed by the processing module 1020 in FIG. 10. The receiver 1330 may be configured to implement the operations performed by the receiving module 1010 in FIG. 10. The transmitter 1340 may be configured to implement the operations performed by the sending module 1030 in FIG. 10.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method comprising:
    receiving, by a terminal, first information, wherein the first information comprises a first aggregate maximum bit rate (AMBR) of a protocol data unit (PDU) session, the first AMBR is an AMBR of a flow served by a second network device in the PDU session, and the second network device is a secondary node serving the terminal;
    performing, by the terminal, based on the first AMBR, the PDU session with the second network device including limiting, by the terminal, an actual bit rate of the flow served by the second network device in the PDU session to be less than or equal to the first AMBR;
    receiving, by the terminal, second information, wherein the second information comprises a second AMBR of the PDU session, the second AMBR is an AMBR of a flow served by a first network device in the PDU session, and the first network device is a master node serving the terminal; and
    performing, by the terminal, based on the second AMBR, the PDU session with the first network device including limiting, by the terminal, an actual bit rate of the flow served by the first network device in the PDU session to be less than or equal to the second AMBR.

2. The communication method according to claim 1, wherein the performing, by the terminal, based on the second AMBR, the PDU session with the first network device comprises:
    performing, by the terminal, data transmission of the PDU session by using only the first network device, in response to a volume of data buffered in the PDU session is less than or equal to a data volume threshold determined based on the second AMBR, and sending an uplink buffer status report (UL BSR) to the first network device, wherein the UL BSR comprises the volume of the buffered data.

3. The communication method according to claim 1, wherein the performing, by the terminal, based on the second AMBR, the PDU session with the first network device comprises:
    sending, by the terminal, an uplink buffer status report (UL BSR) to the first network device and the second network device, in response to a volume of data buffered in the PDU session is greater than a data volume threshold determined based on the second AMBR, and performing data transmission of the PDU session by using the first network device and the second network device, wherein the UL BSR comprises the volume of the buffered data.

4. The communication method according to claim 1, wherein the first AMBR is an AMBR of an uplink flow in the PDU session or is an AMBR of a downlink flow in the PDU session.

5. A terminal comprising:
    a processor;
    a transceiver coupled with the processor and configured to communicate with another network element; and
    a non-transitory computer-readable storage medium coupled with the processor and configured to store a program including instructions which, when executed by the processor, cause the processor to:
    receive first information, wherein the first information comprises a first aggregate maximum bit rate (AMBR) of a protocol data unit (PDU) session, the first AMBR is an AMBR of a flow served by a second network device in the PDU session, and the second network device is a secondary node serving the terminal;
    perform, based on the first AMBR, the PDU session with the second network device including limiting an actual bit rate of the flow served by the second network device in the PDU session to be less than or equal to the first AMBR;
    receive second information, wherein the second information comprises a second AMBR of the PDU session, the second AMBR is an AMBR of a flow served by a first network device in the PDU session, and the first network device is a master node serving the terminal; and
    perform, based on the second AMBR, the PDU session with the first network device including limiting an actual bit rate of the flow served by the first network device in the PDU session to be less than or equal to the second AMBR.

6. The terminal according to claim 5, wherein the instructions, when being executed by the processor, cause the processor to:
   perform data transmission of the PDU session by using only the first network device, in response to a volume of data buffered in the PDU session is less than or equal to a data volume threshold determined based on the second AMBR, and send an uplink buffer status report (UL BSR) to the first network device, wherein the UL BSR comprises the volume of the buffered data.

7. The terminal according to claim 5, wherein the instructions, when being executed by the processor, cause the processor to:
   send an uplink buffer status report UL BSR to the first network device and the second network device, in response to a volume of data buffered in the PDU session is greater than a data volume threshold determined based on the second AMBR, and perform data transmission of the PDU session by using the first network device and the second network device, wherein the UL BSR comprises the volume of the buffered data.

8. The terminal according to claim 5, wherein the first AMBR is an AMBR of an uplink flow in the PDU session or is an AMBR of a downlink flow in the PDU session.

* * * * *